(12) United States Patent
Rönnberg et al.

(10) Patent No.: US 12,508,175 B2
(45) Date of Patent: Dec. 30, 2025

(54) ABSORBENT ARTICLE COMPRISING A LUBRICANT AGENT

(71) Applicant: Essity Hygiene and Health Aktiebolag, Gothenburg (SE)

(72) Inventors: Peter Rönnberg, Gothenburg (SE); Shabira Abbas, Gothenburg (SE)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 417 days.

(21) Appl. No.: 17/919,721

(22) PCT Filed: May 14, 2020

(86) PCT No.: PCT/SE2020/050496
§ 371 (c)(1),
(2) Date: Oct. 18, 2022

(87) PCT Pub. No.: WO2021/230783
PCT Pub. Date: Nov. 18, 2021

(65) Prior Publication Data
US 2023/0157907 A1    May 25, 2023

(51) Int. Cl.
*A61F 13/15*     (2006.01)
*A61F 13/511*    (2006.01)
(Continued)

(52) U.S. Cl.
CPC ...... *A61F 13/51113* (2013.01); *A61F 13/513* (2013.01); *A61F 13/53* (2013.01);
(Continued)

(58) Field of Classification Search
CPC .. A61F 13/5113; A61F 13/511; A61F 13/513; A61F 13/53; A61F 13/64;
(Continued)

(56) References Cited

U.S. PATENT DOCUMENTS 3,375,827 A * 4/1968 Bletzinger ........ A61F 13/53756
                                                      604/375
4,324,246 A * 4/1982 Mullane ................ A61F 13/512
                                                      604/371
(Continued)

FOREIGN PATENT DOCUMENTS

CN    1278720 A    1/2001
CN    1518967 A    8/2004
(Continued)

OTHER PUBLICATIONS

Chinese Application No. 202080100377.8; Office Action with English translation dated Dec. 1, 2023; 17 pages.
(Continued)

*Primary Examiner* — Jacqueline F Stephens
(74) *Attorney, Agent, or Firm* — CANTOR COLBURN LLP

(57) ABSTRACT

The present disclosure relates to an absorbent article comprising a liquid-permeable topsheet, a backsheet and an absorbent core sandwiched between the topsheet and the backsheet, the absorbent article extending in a longitudinal direction (L) and in a transverse direction (T), the absorbent article defining a front waist portion, a rear waist portion and a crotch portion arranged between the rear waist portion and the front waist portion as seen in the longitudinal direction (L) and a buttocks portion arranged between the crotch portion and the rear waist portion. The topsheet comprises a first lubricant zone provided with a lubricant agent, the first lubricant zone being arranged over the buttock's portion.

35 Claims, 7 Drawing Sheets

(51) Int. Cl.
*A61F 13/513* (2006.01)
*A61F 13/53* (2006.01)
*A61F 13/64* (2006.01)

(52) U.S. Cl.
CPC .... *A61F 13/64* (2013.01); *A61F 2013/51316* (2013.01); *A61F 2013/5307* (2013.01)

(58) Field of Classification Search
CPC .... A61F 2013/51316; A61F 2013/5307; A61F 2013/530547; A61F 2013/53726; A61F 2013/5373
USPC .......................................... 604/364, 359, 360
See application file for complete search history.

(56) References Cited

U.S. PATENT DOCUMENTS

| | | | |
|---|---|---|---|
| 4,964,860 A * | 10/1990 | Gipson | A61F 5/4401 604/391 |
| 5,294,478 A * | 3/1994 | Wanek | B32B 7/02 428/218 |
| 5,525,346 A | 6/1996 | Hartung et al. | |
| 5,938,649 A | 8/1999 | Ducker et al. | |
| 5,944,705 A | 8/1999 | Ducker et al. | |
| 5,968,025 A | 10/1999 | Roe et al. | |
| 6,503,236 B1 * | 1/2003 | Uitenbroek | A61F 13/51484 604/385.24 |
| 2002/0026165 A1 * | 2/2002 | Elder | A61L 15/46 604/360 |
| 2004/0122394 A1 * | 6/2004 | Fell | A61F 13/535 604/378 |
| 2004/0158216 A1 | 8/2004 | Kasai et al. | |
| 2005/0137544 A1 * | 6/2005 | Schroeder | A61F 13/8405 604/367 |
| 2006/0069370 A1 | 3/2006 | Ellingson et al. | |
| 2008/0287896 A1 * | 11/2008 | Vega | A61L 15/16 604/364 |
| 2014/0058348 A1 | 2/2014 | Arayama et al. | |
| 2018/0028372 A1 | 2/2018 | Fernkvist et al. | |
| 2020/0085994 A1 | 3/2020 | Vega et al. | |

FOREIGN PATENT DOCUMENTS

| | | |
|---|---|---|
| CN | 1994247 A | 7/2007 |
| CN | 103415273 A | 11/2013 |
| CN | 103781447 A | 5/2014 |
| CN | 107106381 A | 8/2017 |
| CN | 109414412 A | 3/2019 |
| JP | H10509896 A | 9/1998 |
| JP | 2004255164 A | 9/2004 |
| JP | 2010525862 A | 7/2010 |
| JP | 2012187152 A | 10/2012 |
| JP | 2017531531 A | 10/2017 |
| JP | 2018504204 A | 2/2018 |
| WO | 9616682 A1 | 6/1996 |
| WO | 2014004440 A1 | 1/2014 |
| WO | 2016062590 A1 | 4/2016 |
| WO | 2016114692 A1 | 7/2016 |

OTHER PUBLICATIONS

European Application No. 20935566.8-1102; Extended European Search Report dated Dec. 5, 2023; 7 pages.
Japanese Application No. 2022-568900; Office Action dated Dec. 26, 2023; 9 pages.
International Search Report & Written Opinion for International Application No. PCT/SE2020/050496; International Filing Date: May 14, 2020; Date of Mailing: Jan. 13, 2021; 16 pages.
Chinese Application No. 202080100377.8; Office Action with English translation dated Apr. 14. 2023; 21 pages.
Chinese Application No. 2020801003778; Office Action dated Mar. 6, 2024; 18 pages.
Japanese Application No. 2022-568900; Office Action dated Jul. 18, 2024; 4 pages.
Colombian Application No. NC2022/0016625,; Office Action dated Mar. 14, 2025; 18 pages.

* cited by examiner

ABSORBENT ARTICLE COMPRISING A LUBRICANT AGENT

CROSS REFERENCE TO RELATED APPLICATIONS

This application is a National Stage application of PCT/SE2020/050496, filed May 14, 2020, which is incorporated by reference in its entirety herein.

TECHNICAL FIELD

The present disclosure pertains to an absorbent article and to a belt-type absorbent article having a reduced friction. In particular, this disclosure pertains to an absorbent article and a belt-type absorbent article comprising a topsheet being coated with a lubricant agent in a first lubricant zone.

BACKGROUND

Absorbent articles of the kind to which this disclosure relates are worn against the skin with the topsheet facing the skin of the user. All uses of products which are applied in direct contact with the skin may lead to unwanted side-effects. These may occur as a result of occlusion, moisture and mechanical factors, such as friction, between the skin and the absorbent article. These factors which all, to different degrees, interact and amplify the influence of each other may cause different forms of skin irritation to users of said articles. While the body facing material is made of a soft, compliant material, the material rubs against the skin during use and may leave a skin which is not completely dry and free of the bodily fluids. After wetting, the mechanical friction, especially so-called wet-friction between the material and the skin, may thus increase the risk of skin irritation.

One reason for mechanical discomfort is relating to clinging, i.e. the forces acting between the absorbent product and the human skin in the presence of small amounts of moisture such as perspiration, sweat and urine. Clinging can be described as a perpendicular force acting between a solid material and a support surface in the presence of a small amount of moisture. Wet friction is experienced between a wet or moist product and skin. Wet friction can occur even at small concentrations of moist or liquid presence in the product or in the boundary between the surface material and the skin. Dry friction is experienced between a dry product and skin.

Friction between the absorbent article and the skin of the user and pressure applied to the topsheet material may particularly cause discomfort and skin irritations for bedridden caretakers using heavy incontinence articles and for absorbent articles used during night time. Bedridden caretakers often remain for a prolonged time without changing position, leading to a higher pressure on certain areas of the body. Particularly, the pressure may be high on the sacrum region since the caretaker remains a longer time on their back.

When changing absorbent article for bedridden caretakers, particularly during nighttime, caregivers often remove the article by asking the caretaker to lift their bottom and to allow a used article to be pulled out from beneath the care taker and a new article to be positioned beneath the buttocks of the caretaker. Alternatively, the caretaker is turned from one side such that the article may be folded in under the patent and subsequently to the other side such that a soiled article can be removed and a new article can be applied to the caretaker. However, in both cases removal of a soiled article often involves that the rear/buttock's portion of the absorbent article is pulled out from in under the patient, resulting in friction between the absorbent article rear/buttock's portion, a side panel or a belt of the absorbent and the skin of the caretaker.

The shear forces created in certain areas of the absorbent article, both due to the wetting and to the movement pattern of the caretaker, may be therefore be high.

Creams, lotions, or ointments can be used to reduce the friction and to improve the skin condition. However, the use of such hydrophobic compositions has a negative impact on the absorbency performance of absorbent articles, and it is not always desired to transfer substances and composition to the skin of the user.

The disclosure discusses provision an absorbent article and/or a belt-type absorbent article, such as a heavy incontinence article, having improved skin benefits, over a prolonged period of use and after larger wettings.

SUMMARY

One or more of the above objects may be achieved with an absorbent article in accordance with claim 1 and/or with a belt-type absorbent article according to claim 28. Further advantages and advantageous features are disclosed in the following description and in the dependent claims.

In a first aspect, the present disclosure relates to an absorbent article, such as a diaper and an adult incontinence article, comprising a liquid-permeable topsheet, a backsheet and an absorbent core sandwiched between the topsheet and the backsheet. The absorbent article extends in a longitudinal direction and in a transverse direction. The absorbent article defines a front waist portion, a rear waist portion and a crotch portion arranged between the front waist portion and the rear waist portion as seen in the longitudinal direction. A buttocks portion is arranged between the crotch portion and the rear waist portion. The topsheet comprises a first lubricant zone provided with a lubricant agent, the first lubricant zone being arranged over the buttocks portion.

The term "absorbent article" refers to a product that is placed against the skin of the wearer to absorb and contain body exudates, like urine and faeces. The disclosure mainly refers to disposable absorbent articles, which means articles that are not intended to be laundered or otherwise restored or reused as an absorbent article. Examples of disposable absorbent articles include pant diapers, open diapers and belt-type absorbent articles and the like.

The topsheet of the absorbent article is the layer facing the wearer during use. The topsheet may be a fibrous nonwoven layer.

The buttock's portion is the portion of the absorbent article facing the sacrum region of the wearer during use. The buttock's portion may extend between a rear edge of the absorbent core and a transverse transition line arranged at a distance from the rear waist edge of the absorbent article of 40% of the total length of the absorbent article. The buttock's portion overlies a longitudinal centerline of the absorbent article.

Friction occurring between a topsheet material, such as a nonwoven material or a perforated plastic film or netting, and the skin of the user is different in the presence of liquid/moisture than when no liquid/moisture is present. Even a very small amount of moisture present, such as when the moisture originates from perspiration or other body fluids, has an impact on the friction forces occurring between the surface material and the skin of the user. It has therefore been discovered that it is important to carefully design the absorbent characteristics and the surface layer of the absorbent article so that the mechanical discomfort during the overall use of the product is reduced.

Bedridden caretakers often remain a longer time without changing position, particularly lying on their back. The pressure on certain areas of the body such as the sacrum region, may therefore be high in the region corresponding to the buttock's region for the absorbent article. When removing the absorbent article, particularly during nighttime, pressure from the caregiver body is applied in this region resulting in high friction between the absorbent article rear/buttock's portion. As bedridden caretakers often are elderly caretakers, the skin of these caretakers is often thinner and more fragile, increasing the importance of reduced friction.

The Rewet Under Pressure value is based on measurements of the ability of an absorbent article to retain 0.9% saline solution under simulated in-use pressure conditions arising on a pressure area of the article when a user of the article is in a lying down position. The method for measuring the Rewet Under Pressure value is disclosed herein below. A low rewet in the pressure area, i.e. a dryer zone in the sacrum and perineum area, leads to reduced wet friction in an area where the shear forces may be high, especially for bedridden caretakers. The Rewet under Pressure method is disclosed herein below and includes addition of five 100 ml doses of 0.9 NaCl solution. A Rewet 3 value is measured after the third dose, a Rewet 4 value is measured after the fourth dose, a Rewet 5 value is measured after the fifth dose and the Rewet 6 value is measured 6 hours after the fifth dose, with the absorbent article let under pressure for 6 hours.

The article may have a Rewet 6 value of 20 gsm or less, or 15 gsm or less, or 13 gsm or less, or 11 gsm or less as measured according to the Rewet Under Pressure method as disclosed herein.

It has been found that when providing the topsheet of an absorbent article having a Rewet 6 value according to the present disclosure with a lubricant agent in the buttock's region, a surprisingly important reduction in the mechanical discomfort may be achieved, resulting in a significantly enhanced skin health of the user of the absorbent article over a prolonged period of use and/or after larger wettings.

The absorbent article may have a Rewet 5 value of 30 gsm or 23 gsm or less, as measured according to the Rewet Under Pressure method and after the fifth dose as disclosed herein, such as within the range of from 5 gsm to 23 gsm.

The absorbent article may have a Rewet 4 value of 20 gsm or less or 12 gsm or less, as measured according to the Rewet Under Pressure method and after the fourth dose as disclosed herein, such as within the range of from 2 gsm to 12 gsm.

The absorbent article may a Rewet 3 value of 10 gsm or less or 5.5 gsm or less, as measured according to the Rewet Under Pressure method after the third dose as disclosed herein, such as within the range of from 1 gsm to 5.5 gsm.

The first lubricant zone may be arranged in the buttock's portion and the rear waist portion. The rear waist portion may be a central rear waist portion. The rear waist portion may include the central rear waist portion and a first and a second lateral rear waist portion arranged on a respective side of the central rear waist portion as seen in the transverse direction.

The rear waist portion extends from a rear waist edge of the absorbent article and towards the buttocks portion. The rear waist portion may extend between a rear end edge of the absorbent core and the rear waist edge.

The first lubricant zone is intended to be arranged for being in contact with the sacrum region of the caretaker. This is a region that is often exposed to high pressure levels during use of the absorbent article and particularly when lying down.

The first lubricant zone may have a surface area of 25 $cm^2$ or greater, optionally within the range of from 25 $cm^2$ to 600 $cm^2$.

The first lubricant zone may have a surface area of 1-30% of the total surface area of the topsheet, or 2-25%, or 5-20% of the total surface area of the topsheet.

The amount of lubricating agent in the first lubricant zone (109) may be 10 ppm to 10% by weight, based on the total weight of the topsheet in the first lubricant zone (109), or 0.05% to 2% by weight, or 0.1% to 2% by weight, based on the total weight of the topsheet in the first lubricant zone (109).

Optionally, the topsheet may comprise from 0.3 to 4.0 gsm lubricant agent, or 0.3 to 2.0 gsm lubricant agent, as measured over the total first lubricant zone. Such levels have been seen to provide an improved wet friction.

The lubricant agent may be applied by any suitable method or combination of method, such as for example spraying, kiss rolling or dipping. For application methods in which the lubricant needs to be mixed with water to prior to application, the lubricant may have an HLB which is within the range of from 8 to 18 in order to mix well with water.

By "HLB" herein is meant the hydrophilic-lipophilic balance. As is known to the person skilled in the art, the HLB of a compound is a measure of the degree to which it is lipophilic or hydrophilic. The HLB value may be determined by calculating values for the different regions of the compound. One method to determine the HLB value is Griffin's method, as described in 1954, *Journal of the Society of Cosmetic Chemists,* 5 (4): 249-56.

The lubricant agent may have a molecular weight of 500 g/mol or more or such as 1000 g/mol or more. A lubricant agent having a molecular weight of 500 g/mol or more, or 1000 g/mol or more, is less prone to migrate from the fibrous nonwoven and to the skin of the user and/or downwards into the absorbent articles, such as into an underlying absorbent core. This thus prolongs the effect of the lubricant agent on the wearer facing side of the absorbent article. Furthermore, as the lubricant agent may have a molecular weight of 500 g/mol or more, or 1000 g/mol or more, it does not pass the skin barrier if a fraction of the lubricant agent would anyhow migrate from the fibrous nonwoven and to the skin of the user.

The lubricant agent may be applied in a coating and the coating comprising the lubricant agent may have a water content of 5.0 wt. % or less, or 1.0 wt. % or less. The coating may thus be a lubricating agent, having a water content of 5.0 wt. % or less, or 1.0 wt. % or less. The coating provided on the topsheet is intended to remain on the topsheet throughout the use of the absorbent article and a relatively dry coating remains to a higher extent on a topsheet than liquid or semi-liquid compositions which may be more prone to migrate from the topsheet. The fact that the coating may be a relatively dry coating has been seen to enhance the wet friction reducing effect over time. It may also be beneficial that the lubricant agent may have a water content of 5.0 wt. % or less, or 1.0 wt. % or less, since the lubricant agent may remain over the buttock's portion to a higher extent.

The topsheet may comprise at least one surface zone being a lubricant agent free zone. The lubricant agent free zone may be provided in the crotch portion. The lubricant agent free zone provided in the crotch portion may have a surface area of 50 cm$^2$ or greater, optionally within the range of from 50 cm$^2$ to 600 cm$^2$. The front waist portion may also have a lubricant agent free zone.

For bedridden caretakers, the waist front portion and the crotch portion are both in contact with the skin during use. However, even though these portions are in contact with the skin during use, the regions are not applied against the skin with pressure and the sheer force between the skin and the topsheet in these regions are less important.

The topsheet may comprise a second lubricant zone and the amount of lubricant agent in the second lubricant zone may be lower than in the first lubricant zone.

The amount of lubricating agent in first lubricant zone may be at least 25% higher than in the second lubricant zone.

The second lubricant zone may be provided in the rear waist portion on the user facing side of the article. The second lubricant zone may be arranged on a respective lateral side of the first lubricant zone.

The lubricant agent may be any one, or a combination, of the following; wax, a lubricant agent comprising an alkoxylated diester selected from the group consisting of fatty ester lubricants or a lubricant agent comprising a silicone oil. The alkoxylated diester may be alkoxylated diester of myristyl alcohol and adipic acid. The silicone oil may be polydimethylsiloxane.

The thickness of the absorbent article, in the buttock's portion may be from 4 mm at 0.5 kPa, as measured according to WSP120.6.R4 (12). Optionally, the thickness of the absorbent article, in the buttock's portion may be from 5 mm at 0.5 kPa, or from 6 mm at 0.5 kPa, such as up to 30 mm.

The backsheet may be a vapor permeable backsheet defining a Water Vapor Transmission Rate (WVTR) of at least 3500 grams per square meter per 24 hours.

A breathable backsheet may provide less moisture at the surface layer and thus promote, in combination with the lubricant agent and the low Rewet Under Pressure value an enhance skin health and reduced friction between the absorbent article and the skin of the wearer.

The topsheet may be a fibrous nonwoven layer, optionally a fibrous nonwoven layer consisting essentially of thermoplastic fibers, such as polyolefin fibers.

The absorbent core may comprise a first absorbent layer and a second absorbent layer, wherein the first absorbent layer may have a first absorbent layer front edge and a first absorbent layer rear edge and wherein the second absorbent layer may have a second absorbent layer front edge and a second absorbent layer rear edge, the absorbent layers each having a size and a shape in a plane of the absorbent article. The size and shape of the second absorbent layer may define the size and shape of the absorbent core in the plane of the absorbent article and the first absorbent layer may be shorter than the second absorbent layer, as seen in the longitudinal direction of the absorbent article.

Each of the first and the second absorbent layers may comprise superabsorbent polymers.

The first absorbent layer may be an upper absorbent layer and the second absorbent layer may be a lower absorbent layer and the amount of superabsorbent polymer may be from 1.6 times higher in the upper absorbent layer than in the lower absorbent layer, optionally from 1.7 times higher in the upper absorbent layer than in the lower absorbent layer, optionally up to 4 times higher.

The first absorbent layer front edge may be arranged with a front edge distance d1 from the second absorbent layer front edge and the first absorbent layer rear edge may be arranged with a rear edge distance d2 from the second absorbent layer rear edge and wherein a ratio between the front edge distance d1 and the rear edge distance d2 is 1.5 or greater.

The absorbent article may include a transfer layer arranged between the topsheet and the absorbent core, the transfer layer having a transfer layer front edge and a transfer layer rear edge. The transfer layer front edge may be arranged with a second front edge distance d3 from the second absorbent layer front edge and the transfer layer rear edge may be arranged with a second rear edge distance d4 from the second absorbent layer rear edge and a ratio between the second front edge distance d3 and the second rear edge distance d4 may be 1 or greater.

The rear waist portion of the absorbent article may be free from elastic threads.

The article may be constituted by a diaper or incontinence article, such as of the open diaper type, pant diaper or a belt-type absorbent article.

The absorbent article may be an adult incontinence absorbent article.

The absorbent article may be an over-night absorbent article.

According to a second aspect, the present disclosure relates to a belt-type absorbent article. The absorbent article is a belted absorbent article comprising an absorbent pad and a separate belt to which the pad is detachably attached, and which belt is to be placed around the waist of the wearer to hold the pad when the article is being worn. The absorbent pad comprises a liquid-permeable topsheet, a backsheet and an absorbent core sandwiched between the topsheet and the backsheet. The absorbent pad extends in a longitudinal direction and in a transverse direction. The absorbent pad defines a front waist portion, a rear waist portion and a crotch portion arranged between the rear waist portion and the front waist portion, as seen in the longitudinal direction. A buttocks portion is arranged between the crotch portion and the rear waist portion. A first lubricant zone is arranged on the topsheet in the buttocks portion of the absorbent article. The separate belt is provided with a lubricant agent in a belt lubricant zone.

The amount of lubricant agent in the belt lubricant zone may be lower than the amount of lubricant agent in the first lubricant zone, as measured in grams lubricant agent and per cm$^2$, i.e. in grams per square meter (gsm). The amount of lubricant agent in the belt lubricant zone may be at least 10% lower than in the first lubricant zone. The amount of lubricant agent in the belt lubricant zone may be at least 20% or 30% lower than in the first lubricant zone. The amount of lubricant agent in the belt lubricant zone may be from 20% to 80% lower than in the first lubricant zone.

The first lubricant zone may be arranged both in the buttock's portion and in the rear waist portion. The rear waist portion may be a central rear waist portion. The rear waist portion may include the central rear waist portion and a first and a second lateral rear waist portion arranged on a respective side of the central rear waist portion as seen in the transverse direction. The buttocks portion may overlap the rearmost part of the absorbent core.

The belt-type absorbent article may be an over-night absorbent article.

A belt-type absorbent article according to the second aspect of the present disclosure has a front and rear waist region and covers relatively large areas of the lower torso and may therefore create occlusion for certain parts of the skin, thereby potentially causing overhydration of the skin. The belt is also tightly fitted around the waist of the user and may cause friction upon the user moving around while wearing the belt-type absorbent article. Friction occurring between a topsheet material, such as a nonwoven material, and the skin of the user is different in the presence of liquid/moisture than when no liquid/moisture is present. Even a very small amount of moisture originating from perspiration or other body fluids has an impact on the friction forces occurred between the topsheet material and the skin of the user.

It has been realized that one main reason for mechanical discomfort is related to "clinging", i.e. forces acting between the absorbent product and the human skin in the presence of moisture (perspiration, sweat, urine). The absorbent product provides for low friction between the skin of the user and the product, both when the area is substantially dry but also when the area is moist due to perspiration and sweat or the presence of other bodily fluids.

Bedridden caretakers often remain longer time, particularly lying on their back, without changing position. The pressure on certain areas of the body such as the sacrum region, may therefore be high in the region corresponding to the buttock's region for the absorbent article. When removing the belt-type absorbent article the pressure from the caregiver body is applied in this region resulting in high friction between the absorbent article rear/buttock's portion. When pulling the absorbent article downwardly, the belt may also be in contact with the caretaker hip region resulting in a high sheer force. As this is often elderly caregivers, the skin is often thinner and more fragile as well, increasing the importance of reduced friction.

The rear waist portion extends from a rear waist edge of the absorbent pad and towards the buttocks portion. The rear waist portion may extend between a rear end edge of the absorbent core and the rear waist edge.

The buttock's portion is the portion of the absorbent pad facing the sacrum region of the wearer during use. The buttock's portion may extend between a rear edge of the absorbent core and a transverse transition line arranged at a distance from the rear waist edge of the absorbent article of 40% of the total length of the absorbent article. The buttock's portion overlies a longitudinal centerline of the absorbent pad.

The length of the crotch portion may be from 20% to 25% of the length of the absorbent pad and be arranged with equal distance to a front waist edge and to a rear waist edge of the absorbent pad.

The length of the buttocks portion may be from 25% to 35% of the length of the absorbent pad.

The first lubricant zone is arranged to be in contact with the sacrum region of the caretaker. This is a region that is often exposed to high pressure levels during use of the absorbent article and particularly when lying down.

The lubricant agent may be applied by several different methods, such as for example spraying, kiss rolling or dipping. For application methods in which the lubricant needs to be mixed with water to prior to application, the lubricant may have an HLB which is within the range of from 8 to 18 in order to mix well with water.

The absorbent pad may have a Rewet 6 value of 20 gsm or less or 13 gsm or less, as measured according to the Rewet Under Pressure method as disclosed herein. It has been found that when providing the topsheet of an absorbent article having a Rewet 6 value according to the present disclosure with a lubricant agent in the buttock's region, a surprisingly important reduction in the mechanical discomfort may be achieved and result in an enhanced skin health of the user of the belt-type absorbent article when using the belt-type article over a prolonged period and/or after larger wettings.

The Rewet Under Pressure value is based on measurements of the ability of the absorbent article to retain 0.9% saline solution under simulated in-use pressure and pressure area in a lying down position. The method for measuring the Rewet Under Pressure value is disclosed herein below.

By "HLB" herein is meant the hydrophilic-lipophilic balance. As is known to the person skilled in the art, the HLB of a compound is a measure of the degree to which it is lipophilic or hydrophilic. The HLB value may be determined by calculating values for the different regions of the compound. One method to determine the HLB value is Griffin's method, as described in 1954, *Journal of the Society of Cosmetic Chemists*, 5 (4): 249-56.

The lubricant agent may have a molecular weight of 500 g/mol or more or such as 1000 g/mol or more. A lubricant agent having a molecular weight of 500 g/mol or more, or 1000 g/mol or more, is less prone to migrate from the fibrous nonwoven and to the skin of the user and/or downwards into the absorbent articles, such as into an underlying absorbent core. This thus prolongs the effect of the lubricant agent on the wearer facing side of the absorbent article. Furthermore, as the lubricant agent may have a molecular weight of 500 g/mol or more, or 1000 g/mol or more, it does not pass the skin barrier if a fraction of the lubricant agent would anyhow migrate from the fibrous nonwoven and to the skin of the user.

The lubricant agent may be applied in a coating and the coating comprising the lubricant agent may have a water content less than 5.0 weight percent, or less than 1.0 weight percent. The coating provided on the topsheet is intended to remain on the topsheet throughout the use of the absorbent article and a coating having a water content less than 5.0 weight percent, or less than 1.0 weight percent remains to a higher extent on the topsheet than liquid or semi-liquid compositions which may be more prone to migrate from the topsheet, and also to migrate from the buttock's portion. The fact that the coating has water content less than 5.0 weight percent, or less than 1.0 weight percent is a dry coating has also been seen to enhance the wet friction reducing effect over time.

The topsheet may comprises at least one surface zone being a lubricant agent free zone. The lubricant agent free zone may be provided in the crotch portion. The lubricant agent free zone provided in the crotch portion may have a surface area of 50 cm$^2$ or greater, optionally within the range of from 50 cm$^2$ to 600 cm$^2$. The front waist portion may also have a lubricant agent free zone.

For bedridden caretakers, the waist front portion and the crotch portion are both in contact with the skin during use. However, even though these portions are in contact with the skin during use, the regions are not applied against the skin with pressure and the sheer force between the skin and the topsheet in these regions are less important.

The topsheet may comprise a second lubricant zone and the amount of lubricant agent in the second lubricant zone may be lower than in the first lubricant zone.

The amount of lubricating agent in first lubricant zone may be at least 25% higher than in the second lubricant zone.

The second lubricant zone may be provided in the rear waist portion on the user facing side of the article. The second lubricant zone may be arranged on a respective lateral side of the first lubricant zone.

The lubricant agent may be any one, or a combination, of the following; wax, a lubricant agent comprising silicone oil or a lubricant agent comprising an alkoxylated diester selected from the group consisting of fatty ester lubricants. The alkoxylated diester may be an alkoxylated diester of myristyl alcohol and adipic acid. The silicone oil may be polydimethylsiloxane.

The thickness of the absorbent pad, in the buttock's portion may be from 4 mm at 0.5 kPa, as measured according to WSP120.6.R4 (12). Optionally, the thickness of the absorbent article, in the buttock's portion may be from 5 mm at 0.5 kPa, or from 6 mm at 0.5 kPa, such as up to 30 mm.

The backsheet may be a vapor permeable backsheet defining a Water Vapor Transmission Rate (WVTR) of at least 3500 grams per square meter per 24 hours.

A breathable backsheet may provide less moisture at the surface layer and thus promote, in combination with the lubricant agent and the low Rewet Under Pressure value an enhance skin health and reduced friction between the absorbent article and the skin of the wearer.

The topsheet may be a fibrous nonwoven layer, optionally a fibrous nonwoven layer consisting essentially of thermoplastic fibers, such as polyolefin fibers.

The absorbent core may comprise a first absorbent layer and a second absorbent layer, wherein the first absorbent layer may have a first absorbent layer front edge and a first absorbent layer rear edge and wherein the second absorbent layer may have a second absorbent layer front edge and a second absorbent layer rear edge, the absorbent layers each having a size and a shape in a plane of the absorbent article. The size and shape of the second absorbent layer may define the size and shape of the absorbent core in the plane of the absorbent article and the first absorbent layer may be shorter than the second absorbent layer, as seen in the longitudinal direction of the absorbent article.

Each of the first and the second absorbent layers may comprise superabsorbent polymers.

The first absorbent layer may be an upper absorbent layer and the second absorbent layer may be a lower absorbent layer and the amount of superabsorbent polymer may be from 1.6 times higher in the upper absorbent layer than in the lower absorbent layer, optionally from 1.7 times higher in the upper absorbent layer than in the lower absorbent layer, optionally up to 4 times higher.

The first absorbent layer front edge may be arranged with a front edge distance d1 from the second absorbent layer front edge and the first absorbent layer rear edge may be arranged with a rear edge distance d2 from the second absorbent layer rear edge and wherein a ratio between the front edge distance d1 and the rear edge distance d2 is 1.5 or greater.

The absorbent article may include a transfer layer arranged between the topsheet and the absorbent core, the transfer layer having a transfer layer front edge and a transfer layer rear edge. The transfer layer front edge may be arranged with a second front edge distance d3 from the second absorbent layer front edge and the transfer layer rear edge may be arranged with a second rear edge distance d4 from the second absorbent layer rear edge and a ratio between the second front edge distance d3 and the second rear edge distance d4 may be 1 or greater.

BRIEF DESCRIPTION OF THE DRAWINGS

The present invention will be further explained hereinafter by means of non-limiting examples and with reference to the appended drawings wherein.

DETAILED DESCRIPTION

Figure 1:
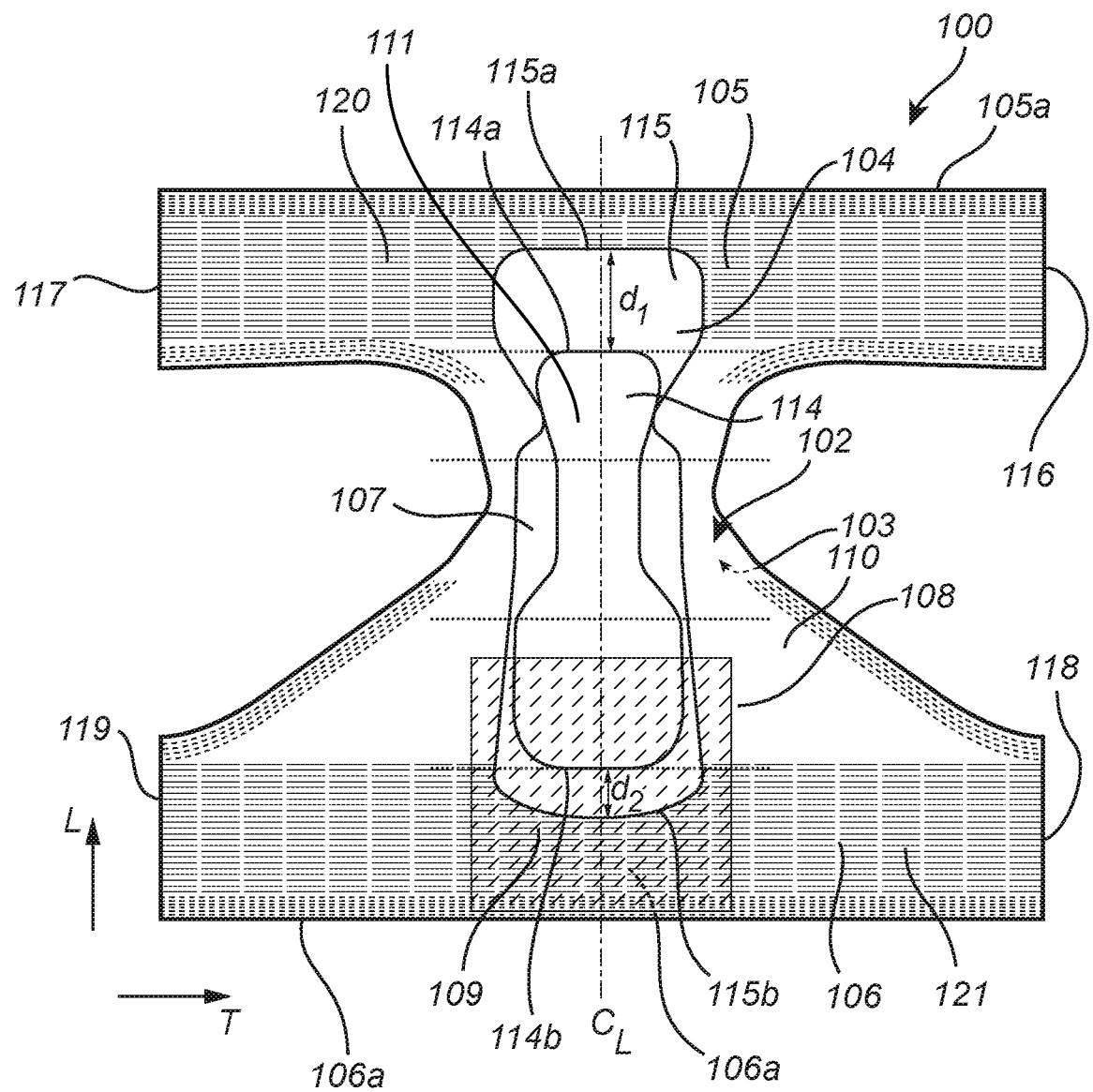
FIG. 1 illustrates an absorbent article according to the present disclosure.

The disclosure will be described more closely below by reference to an exemplary embodiment. The disclosure may however be embodied in many different forms and should not be construed as limited to the embodiments set forth in the drawings and the description thereto.

FIG. 1 schematically illustrates an absorbent article 100 according to the present disclosure. The absorbent article 100 is a pant-type absorbent article. The absorbent article comprises a liquid-permeable topsheet 102, a backsheet 103 and an absorbent core 104 sandwiched between the topsheet 102 and the backsheet 103. The absorbent article 100 extends in a longitudinal direction L and in a transverse direction T. The absorbent article 100 defines a front waist portion 105, a rear waist portion 106 and a crotch portion 107 arranged between the front waist portion 105 and the rear waist portion 106, as seen in the longitudinal direction L.

The topsheet 102 comprises a first lubricant zone 109 provided with a lubricant agent, the first lubricant zone 109 being arranged over a buttock's portion 108 and a central part 106a of the rear waist portion 106 and lying on a longitudinal centerline $C_L$ of the absorbent article 100. The amount of lubricating agent in the first lubricating zone 109 is at least 0.1 wt % of the topsheet, as measured over the total coated area. Optionally, the topsheet may comprise from 0.3 wt. %, or 0.5 wt. %, of the lubricant agent, as measured over the total coated area. Such levels have been seen to provide an improved wet friction.

The topsheet may include or consist of fibrous nonwoven layer(s) being spunbonded, meltblown, carded, hydroentangled, wetlaid etc. Suitable nonwoven materials can be composed of natural fibers, such as wood pulp or cotton fibres, synthetic thermoplastic fibres, such as polyolefins, polyesters, polyamides and blends and combinations thereof or from a mixture of natural and synthetic fibres. The materials suited as topsheet materials should be soft and non-irritating to the skin and be readily penetrated by body fluid, such as urine. The topsheet material may essentially consist of synthetic thermoplastic fibers, such as polyolefins, polyesters, polyamides and blends and combinations thereof. The synthetic fibers may be monocomponent fibers, bicomponent fibers or multicomponent fibers including polyesters, polyamides and/or polyolefins such as polypropylene and polyethylene. That the topsheet and the fibrous nonwoven layer may "essentially consist" of thermoplastic synthetic fibers means that at least 95% of the fibers are thermoplastic synthetic fibers, such as at least 99%, such as at least 100% of the fibers in the nonwoven material are non-absorbent fibers. The topsheet material and the fibrous material may however also include further substances present in small amounts, such as for example binders and pigments, as known by the person skilled in the art.

The backsheet may consist of a thin plastic film, e.g. a polyethylene or polypropylene film, a nonwoven material coated with a liquid impervious material, a hydrophobic nonwoven material, which resists liquid penetration. Laminates of plastic films and nonwoven materials may also be used. The backsheet material can be breathable, allowing vapor to escape from the absorbent structure, while still preventing liquids from passing through the backsheet material. The backsheet material may alternatively be non-breathable.

The front waist portion 105 and the rear waist portion 106 are intended to be joined to each other along two opposite longitudinal side edges 116,117,118,119 to define a waist-opening and a pair of leg-openings. The absorbent article 100 illustrated in FIG. 1 comprises front elastics 120 in the front waist portion 105 and rear elastics 121 in the rear waist portion 6 and partly in the buttock's portion 108. Each of the front elastics 120 and the rear elastics 121 extending between the respective opposite longitudinal side edges 116,117,118,119 in a transverse direction T of the absorbent article 100. The front waist portion 105 has a front waist edge 105a and the rear waist portion 106 has a rear waist edge 106a.

The absorbent core 104 comprises a first absorbent layer 114 and a second absorbent layer 115. The first absorbent layer 114 is an upper absorbent layer arranged between the topsheet 102 and the second absorbent layer 115. The first absorbent layer 114 has a first absorbent layer front edge 114a and a first absorbent layer rear edge 114b. The second absorbent layer 115 has a second absorbent layer front edge 115a and a second absorbent layer rear edge 115b. The absorbent layers 114,115 each has a size and a shape in a plane of the absorbent article 100, the size and shape of the second absorbent layer 115 defining the size and shape of the absorbent core 104 in the plane of the absorbent article 100. The first absorbent layer 114 is shorter than the second absorbent layer 115, as seen in the longitudinal direction L of the absorbent article 100. The first absorbent layer front edge 114a is arranged with a front edge distance d1 from the second absorbent layer front edge 115a and the first absorbent layer rear edge 114b is arranged with a rear edge distance d2 from the second absorbent layer rear edge 115b and wherein a ratio between the front edge distance d1 and the rear edge distance d2 is 1.5 or greater. Hence, the first absorbent layer 114 is arranged rearwardly compared with the second absorbent layer 115.

The buttocks portion 108 is arranged between the crotch portion 107 and the rear waist portion 106. In this figure a transition of the crotch portion 107 and the buttocks portion 108 is arranged with a distance of 40% from the rear waist edge 106b of the total length of the absorbent article 100. The length of the buttocks portion 108 is here from 25% to 35% of the total length of the absorbent core 104. In this figure, the transition between the rear waist portion 106 and the buttocks portion 108 coincides with the first absorbent layer rear edge 114b.

The absorbent core may be of any conventional kind. Examples of commonly occurring absorbent materials are cellulosic fluff pulp, tissue layers, highly absorbent polymers (so called superabsorbents), absorbent foam materials, absorbent nonwoven materials or the like. It is common to combine cellulosic fluff pulp with superabsorbents in an absorbent structure. It is also common to have absorbent structures comprising layers of different material with different properties with respect to liquid acquisition capacity, liquid distribution capacity and storage capacity. For example, each of the first and second absorbent layers 14,15, may comprise superabsorbent polymers. The first absorbent layer 14 may have a higher amount of superabsorbent article, than the second absorbent layer 15.

Figure 2:
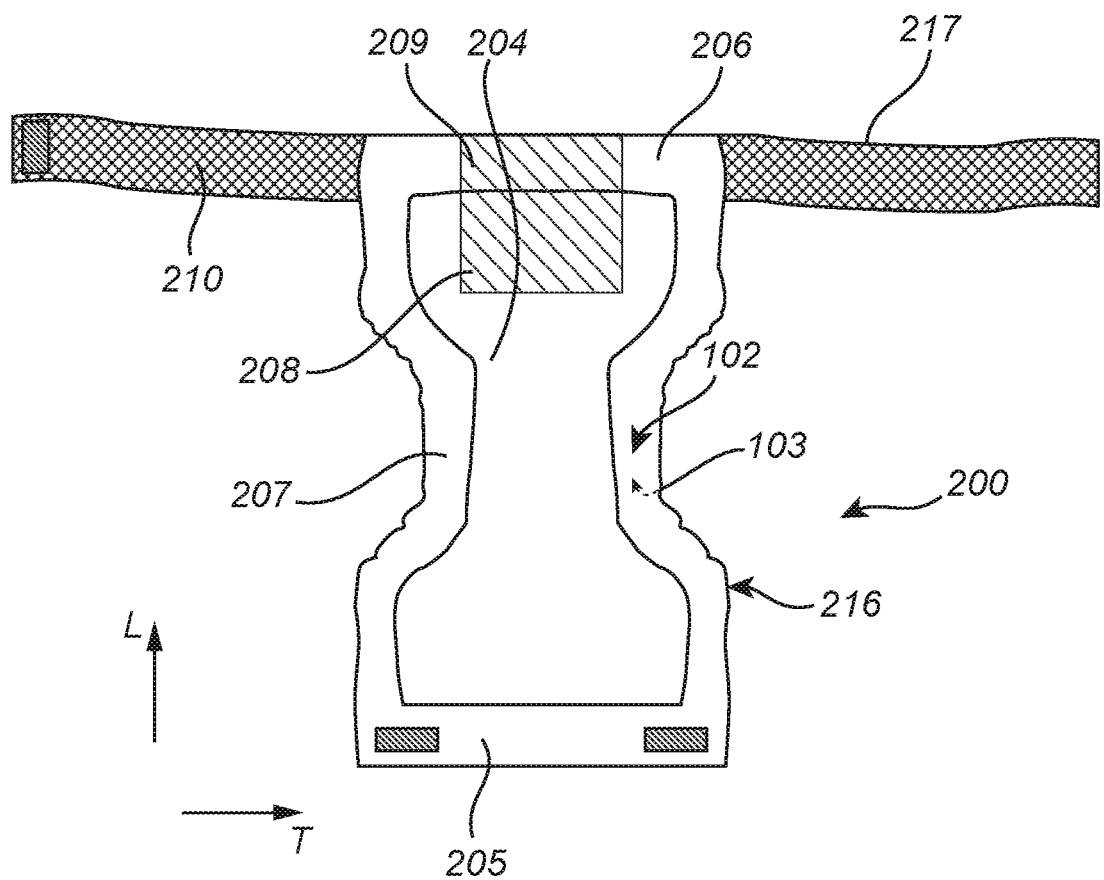
FIG. 2 illustrates a belt-type absorbent article according to the present disclosure.

FIG. 2 illustrates a belt-type absorbent article 200. The belt-type absorbent article 200, comprises an absorbent pad 216 and a separate belt 217 to which the pad is detachably attached and which is to be placed around the waist of the wearer to hold the pad when the article is being worn. The absorbent pad 217 comprises a liquid-permeable topsheet 202, a backsheet 203 and an absorbent core 204 sandwiched between the topsheet 202 and the backsheet 203. The absorbent pad extends in a longitudinal direction L and in a transverse direction T. The absorbent pad defines a front waist portion 205, a rear waist portion 206 and a crotch portion 207 arranged between the rear waist portion 206 and the front waist portion 205 as seen in the longitudinal direction L and a buttocks portion 208 arranged between the crotch portion 207 and the rear waist portion 206. The absorbent article 200 comprises a first lubricant zone 209 arranged on the topsheet 202 in the buttocks portion 208. The first lubricant zone 209 is provided with a lubricant agent. The separate belt is provided with a lubricant agent in a belt lubricant zone 210.

The absorbent pad 216 or the separate belt 217 may comprise attachment elements, such as pieces of hook material adhesive material, arranged on the surface intended to face the separate belt 217 or the absorbent pad 216 respectively. The one of the absorbent pad 216 or the separate belt 217 may comprise corresponding attachment elements or may have a surface to which the hook material or adhesive material may adhere to. If the attachment element is a hook material such material may be a nonwoven material.

The buttocks portion 208 is arranged over the absorbent core 204 and in the area being in contact with the sacrum region of a wearer.

The amount of lubricant agent in the belt lubricant zone is lower than the amount of lubricant agent in the first lubricant zone 9, as measured in grams lubricant agent and per cm$^2$.

Test Method—Rewet Under Pressure

The Rewet Under Pressure test method is a method for measuring rewet of a product after repeated wettings and under pressure, simulating the use-condition for a heavy-incontinence article after repeated wettings.

Equipment

Figure 3:
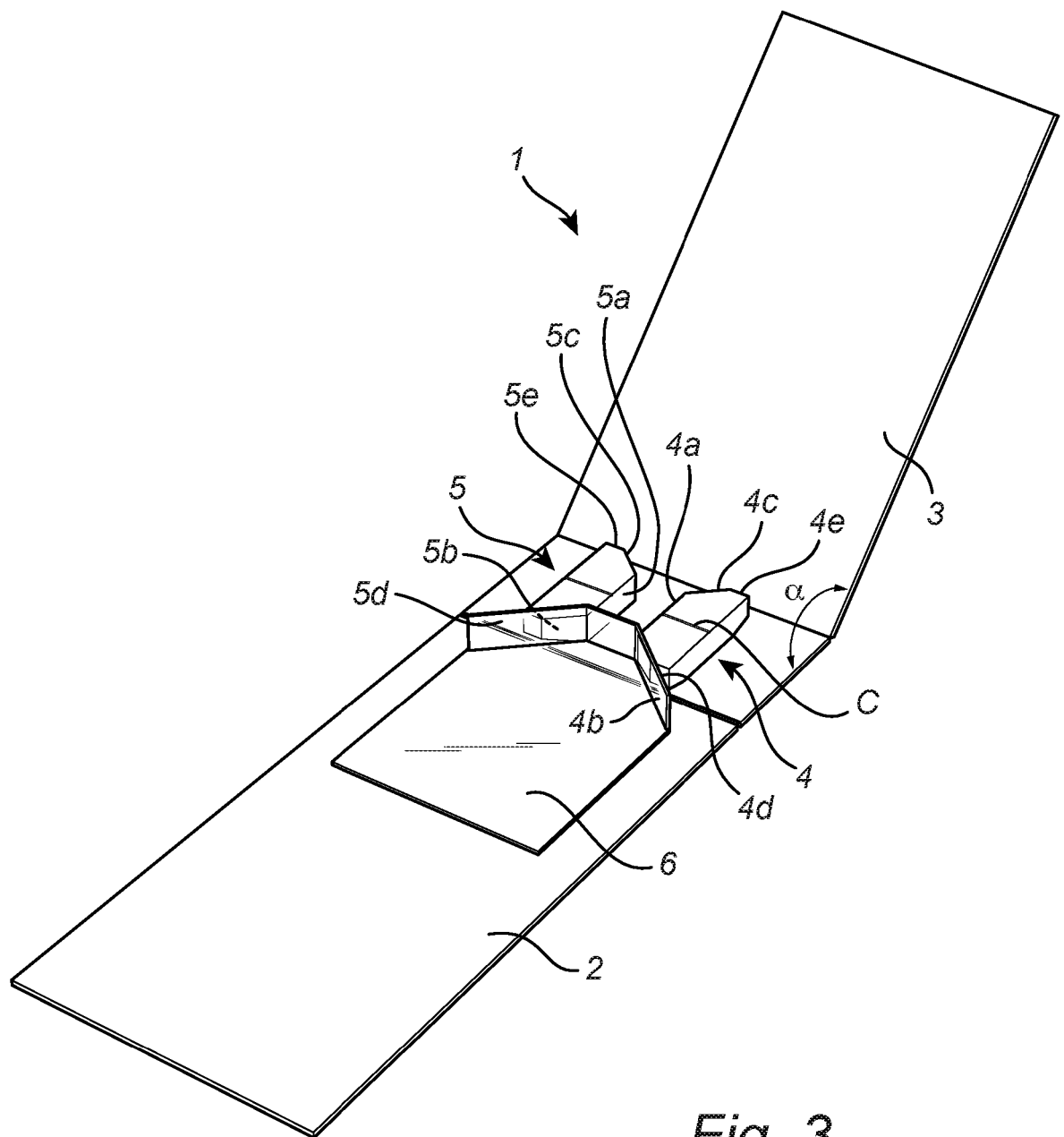
FIG. 3 shows a fixture for use in the Rewet under Pressure method as disclosed herein.
Figure 4A:
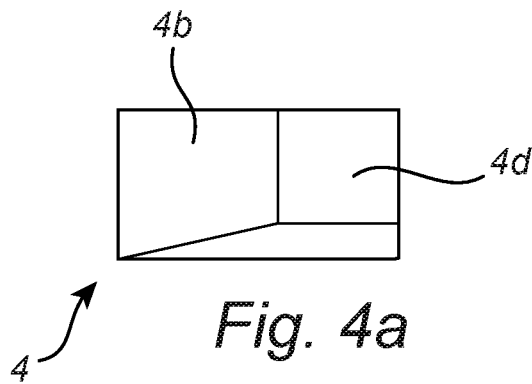
FIGS. 4a-4b show one of the two leg blocks for use in the Rewet under Pressure method as disclosed herein.
Figure 4B:
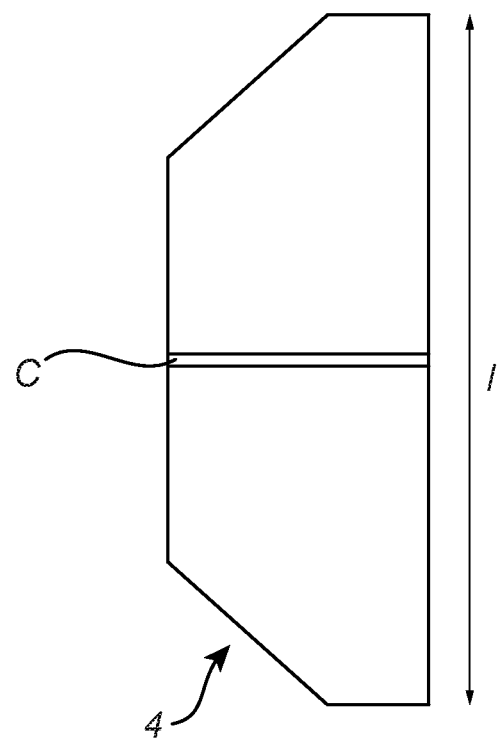
Figure 4C:
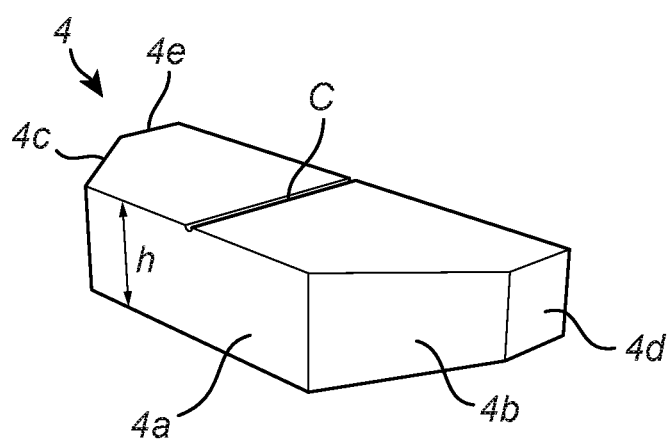

1. Fixture 1 made of polished aluminum (shown in FIG. 3). The fixture 1 comprises a first plate 2 measuring 200×420 mm, and a second plate 3 measuring 200×300 mm. The second plate 3 is arranged with an angle α of 60° with respect to the first plate 2.
2. Two leg blocks 4,5 are made of hard plastic material (see FIGS. 3 and 4a-4c). The leg blocks 4, 5 each has a height h of 35 mm, as measured at its highest height, and length l of 120 mm, as measured at the longest length of the respective leg blocks 4, 5. The width of the respective leg blocks 4,5, as taken along a center line C is 45 mm. The leg blocks 4,5 each comprise a respective inner vertical rectangular side 4a,5a, each measuring 35×55 mm and being arranged to push against the longitudinal sides of a diaper which is arranged in the fixture 1. On a respective side of the inner rectangular sides 4a, 5a, the leg blocks 4, 5 have respective block first side walls 4b,5b and block second side walls 4c,5c. The block side walls 4b,5b,4c,5c are angled upwards and inwards and are arranged between the respective inner rectangular sides 4a, 5a and a respective first and second rectangular side wall 4d,4e, 5d,5e, each having a dimension of 20×20 mm. The second rectangular side walls 4e, 5e of the side blocks 4, 5 are vertically aligned with a junction between the first and second plates 2, 3. The leg blocks 4, 5 are moveable in the cross direction of the fixture 1, and can be locked in position e.g. via screws or magnets.

Figure 5A:
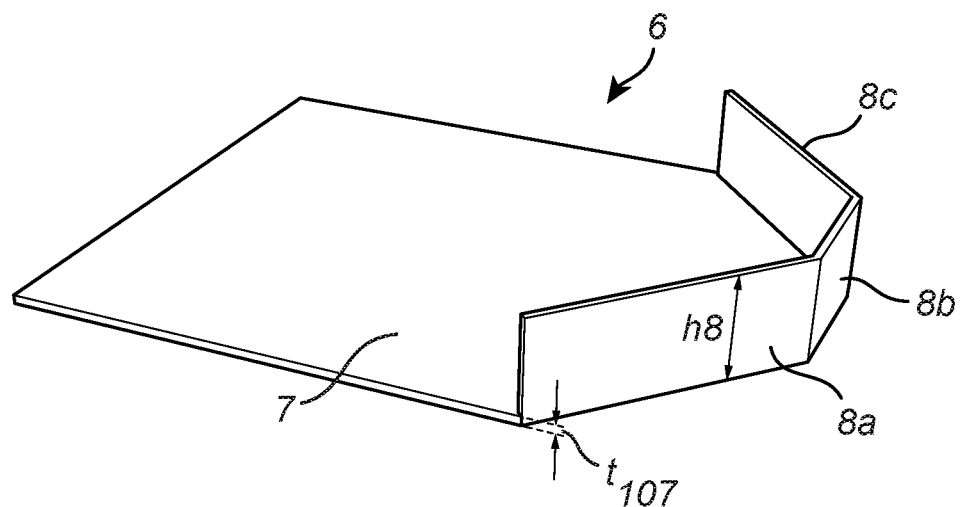
FIGS. 5a-5b show the buttocks template for use in the Rewet under Pressure method as disclosed herein.
Figure 5B:
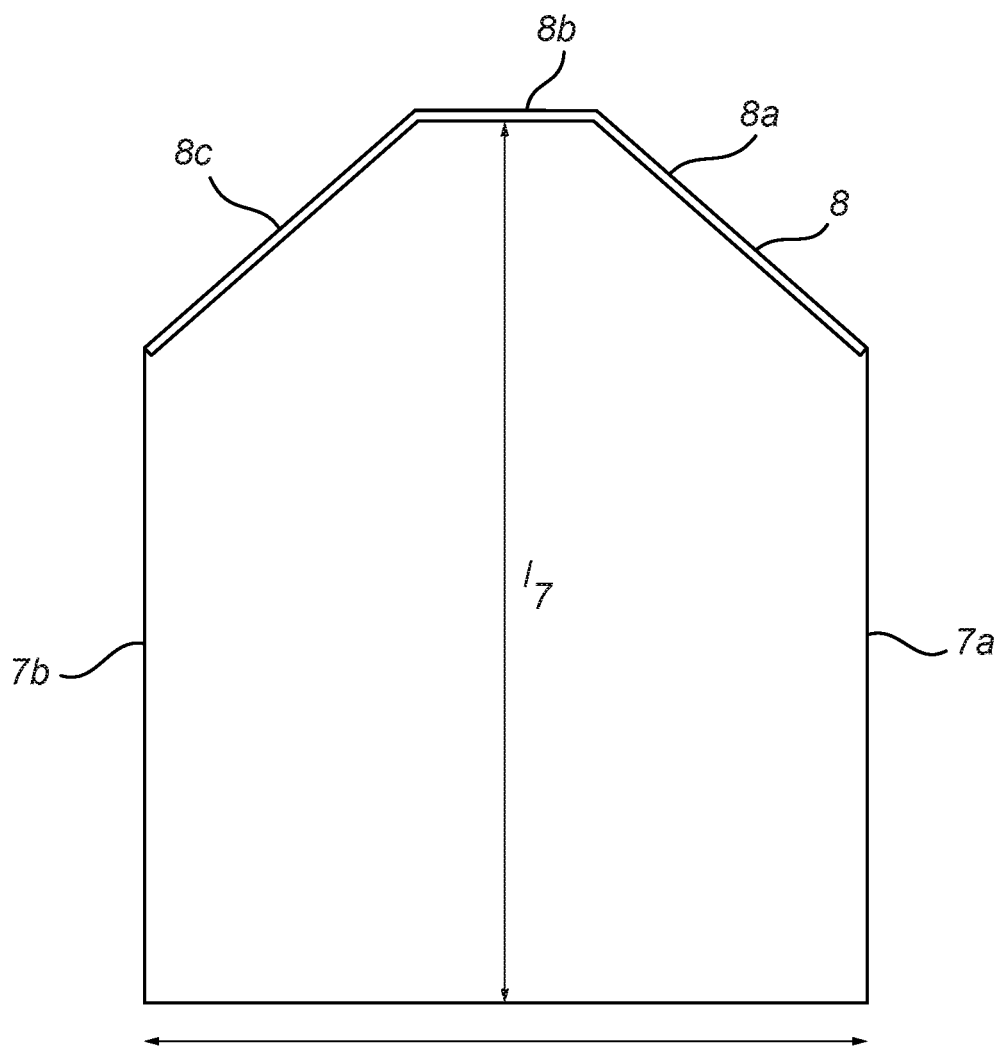

3. Distance template (not shown), a rectangular steel block measuring 40×80 mm, with a height of about 20 mm.
4. Buttocks template 6 made of PMMA (Poly(methyl methacrylate)) or similar (shown in FIG. 3 and FIGS. 5a-5b), having a bottom plate 7 with a length $l_7$ of 175 mm, a width $w_7$ of 150 mm and a thickness t7 of 6 mm. The buttocks template 6 has a template wall 8 having a height $h_8$ of 45 mm. The template wall 8 has three wall sections 8a, 8b, 8c, with a first side wall section 8a, a front wall section 8b and a second side wall section 8c. The front wall section 8b has a width of 50 mm and a height of 45 mm. The longitudinal sides 7a, 7b of the bottom plate 7 each has a length of 115 mm, as measured from a rear end edge of the bottom plate 7 to the respective side wall sections 108a,108c.
5. Metal weight 9, 10 kg.
6. Liquid pump 11 (shown in FIG. 7b), capable of a delivery rate of 10 ml/sec. The pump 11 is connected to a tube 12 with an internal diameter of 3 mm
7. Collagen film, available from Viscofan, Spain. The film is designated Coffi (transparent, article number 706). The film should be stored in a refrigerator, wrapped in plastic. For the rewet measurement, eight sheets are stacked, and cut or punched to dimensions 70×80 mm. The pad (of eight sheets) is suitably held together with a small staple. The pads are then placed in an enclosable polyethylene pouch before testing. Collagen film should be handled with tweezers.
8. Test fluid, 0.9% NaCl solution Procedure The evaluation is made in a stable laboratory environment set to 23° C. and 50% relative humidity. The absorbent articles are conditioned in this same environment for 24 hours before testing. At least six identical absorbent articles are tested. The procedure is described for one of these absorbent articles.

Figure 6:
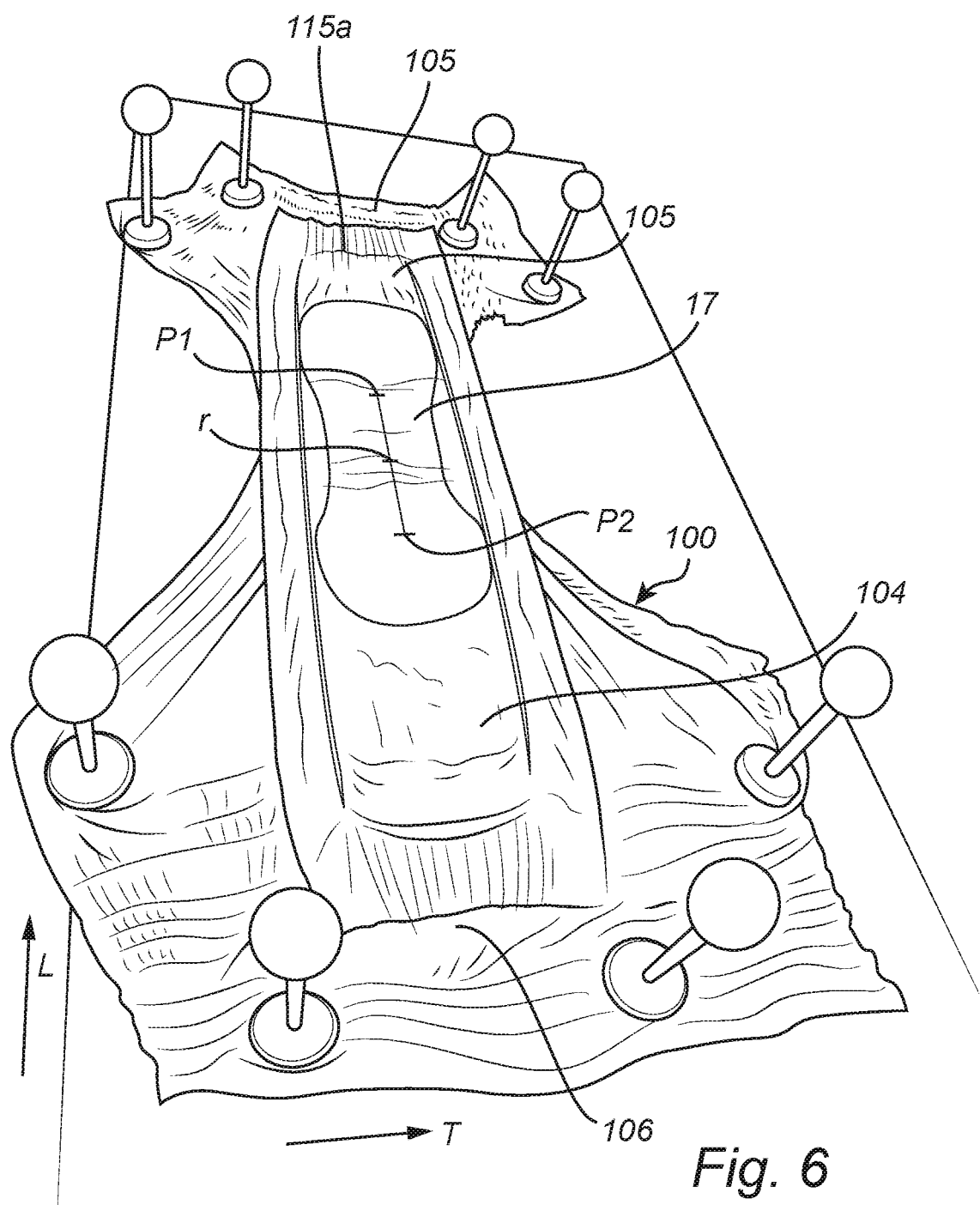
FIG. 6 shows a stretched absorbent article having been cut along the side seams and marked prior to testing in the Rewet under Pressure method as disclosed herein.

The absorbent article 100 to be tested is stretched flat on a laboratory bench and cut along the side seams to remove elastics, as illustrated in FIG. 6. The front and rear waist portions 105,106 of the absorbent article 100 are marked (the front part faces the stomach of the user). The front edge of the absorbent core 104 is identified, here corresponding to the second absorbent layer front edge 115a. Based on the total length of the absorbent core 104 (100%), a crosswise reference line r is drawn over the topsheet 102 of the absorbent article 100 at a distance of 40% of the total length of the absorbent core 104 from the second absorbent layer front edge 115a. Mark a first inlet point P1 for liquid addition 70 mm forward from the reference line r (centered in a transverse direction direction T of the absorbent article 1). Mark a second point P2, 65 mm rearward from the reference line r (centered in the transverse direction T), as a guide for placement of the collagen pad for the rewet measurement.

Figure 7A:
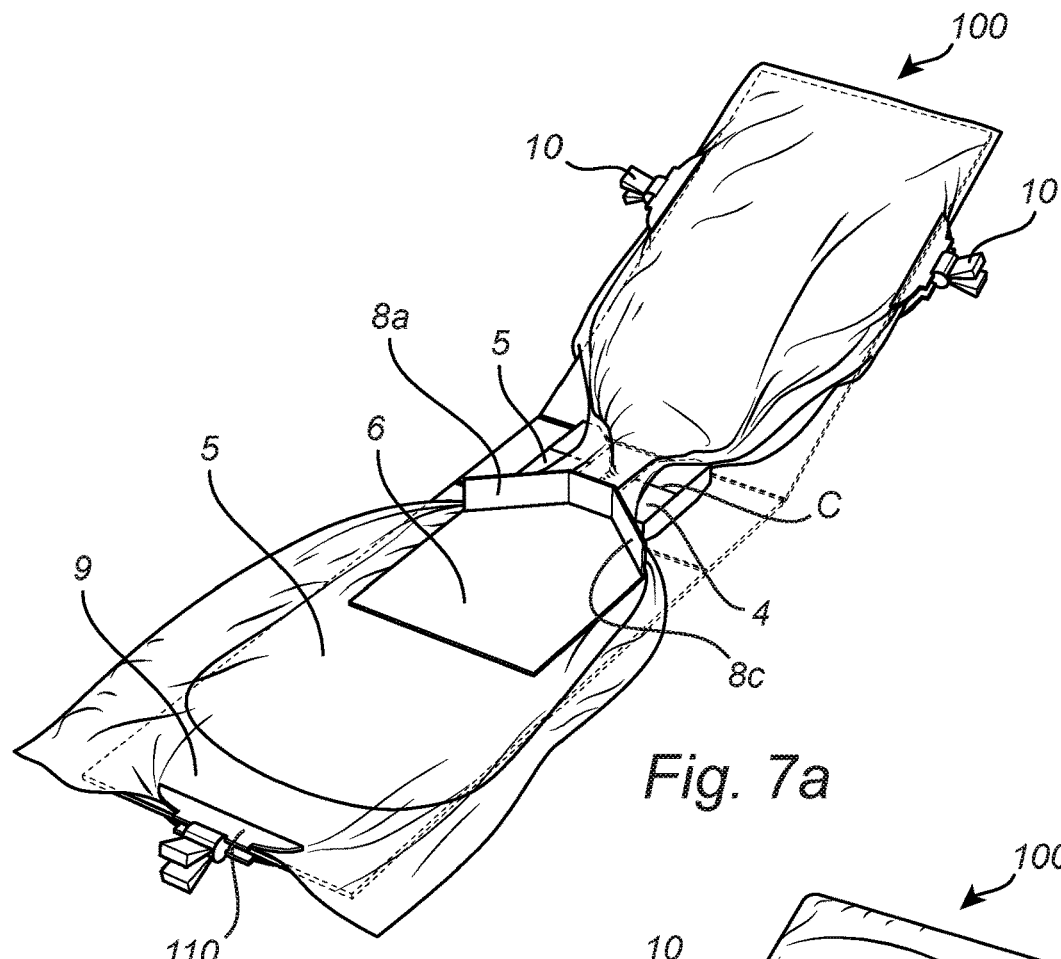
FIGS. 7a-b show the absorbent article tested in the Rewet under Pressure method as disclosed herein.
Figure 7B:
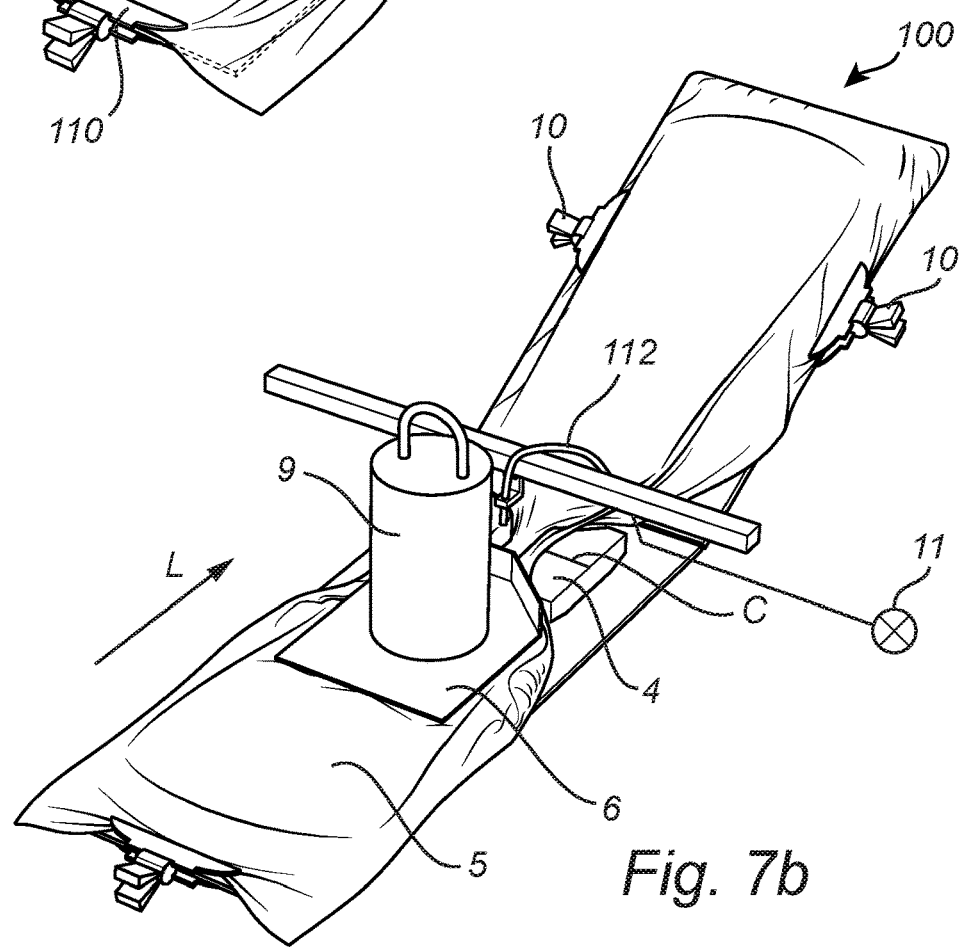

Place the 40×80 mm distance template centered onto the reference line r of the absorbent core 104 (the template length direction coincides with the longitudinal direction L of the absorbent article). Raise any longitudinal leakage barriers outside of the distance template, and slightly fold the longitudinal sides of the absorbent core 104 upwards (if there are no leakage barriers, raise the longitudinal edges of the absorbent member upwards along the sides of the distance template). Push the leg blocks 4,5 arranged on the first plate 2 outwards, to make space, and place the absorbent article 100 in the fixture 1, with the front section 105 of the absorbent article 100 resting on the second plate 3 as illustrated in FIG. 7a, with the buttocks template 6 removed from the fixture 1. Align the reference line r with the center line C of the respective leg blocks 4,5. Then push the leg blocks 4,5 against the distance template, and lock the blocks 4,5 in this position. Carefully stretch the front portion 105 and the rear portion 106 of the absorbent article 100, to remove folds and irregularities (ensure that the alignment between the leg blocks is not affected). Fixate the absorbent article 100 against the first and second plates 2,3 with clamps 10 as illustrated in FIGS. 7a and 7b. Place the buttocks template 6 on the rear part of the absorbent core 104, and push it forwards to align it against the leg blocks 4,5. The vertical wall sections 8a,8c having an angle inwardly towards the middle wall section 8b and are designed to fit tightly against the respective block first side walls 4b, 5b of the leg blocks 4,5. Remove the distance template. Place a 10 kg metal weight 9 centered onto the buttocks template 6 as illustrated in FIG. 7b. Arrange the fluid outlet tube 12 connected to the liquid pump 11 above the liquid inlet point, i.e. at a 90° angle to the plane of the absorbent article 100. The fluid outlet tube 12 being arranged 10 mm above the liquid inlet point P1.

A total of five 100 ml doses are then added to the absorbent article 100. A stop watch is started when each dose has been absorbed (i.e. when there is no more pooled fluid on the diaper surface), and the subsequent dose is introduced after a waiting time of 15 minutes.

Rewet is measured 10 minutes after the third, fourth and fifth doses. For this purpose, remove the 10 kg weight 9 and the buttocks template 6. Wipe the bottom side of the buttocks template 6, intended to be facing the absorbent article 100, free from liquid and moist. Weigh a collagen pad (8 sheets), and then place it on the absorbent article 100, with the length direction of the pad aligned with the longitudinal direction L of the absorbent article 100. The collagen pad is arranged by aligning the front edge of the collagen pad with the second point P2 (shown in FIG. 6) arranged 65 mm rearwards from the reference line r. The length of the collagen pad is positioned away from the reference line r, towards the rear part of the diaper 106. Then put the buttocks template 6 back over the collagen film and carefully lower the 10 kg weight 9 onto the center of the buttocks template 6. After 30 seconds the weight and the buttocks template 6 are removed, the collagen pad is weighed, and liquid pick up is determined (wet collagen weight minus dry collagen weight). The buttocks template 6 and 10 kg weight 9 are then put back, and the dosing schedule continues. A Rewet 3 value is measured after the third dose, a Rewet 4 value is measured after the fourth dose and a Rewet 5 is measured after the fifth dose. After the fifth dose the absorbent article 1 was left in the fixture 101 and under the pressure of the 10 kg weight for 6 hours and a Rewet 6 value was measured after 6 hours. The results are recalculated from grams to grams per square meter (gsm) with respect to the area of the collagen pad.

The total procedure takes about 7.5 hours corresponding to a night's sleep.

Test Results

Tests between an Example 1 absorbent article and an Example 2 absorbent article were carried out to measure the dryness of the topsheet under pressure, i.e. the rewet under pressure as measured according to the Rewet Under Pressure method disclosed herein.

Table 1 below illustrates the amount of absorbent materials in the first and second absorbent layers of the Example 1 article and the Example 2 article.

The Example 2 article is currently on the market with the name Tena Pant Super from Essity Hygiene and Health AB. The Example 1 absorbent article and the Example 2 absorbent article have the same Rothwell, total capacity, value of 2010 ml. Both of the articles comprises an absorbent member having a first absorbent layer, a second absorbent layer and a transfer layer arranged between the upper first absorbent layer and the topsheet. The dimension of the respective layer is substantially the same between the Example 1 and the Example 2 article. In the Example 1 absorbent article, the transfer layer is arranged 60 mm towards a rear edge of the absorbent member compared to the Example 2. For the Example 1 absorbent article the first absorbent layer is arranged 25 mm more towards the ear edge of the absorbent member compared to the Example 2 article.

TABLE 1

|  |  | Fluff pulp (grams) | SAP (grams) |
|---|---|---|---|
| Example 1 | First absorbent layer | 17.0 | 15.3 |
|  | Second absorbent layer | 22.5 | 8.0 |
| Example 2 | First absorbent layer | 14.3 | 9.7 |
|  | Second absorbent layer | 21.4 | 15.2 |

Table 2, shown below, shows test data from an Example 1 absorbent article compared with the Example 2 absorbent article.

TABLE 2

| Absorbent article | No. of replicates | Rewet 3 (gsm) | Rewet 4 (gsm) | Rewet 5 (gsm) | Rewet 6 (gsm) |
|---|---|---|---|---|---|
| Example 1 | 15 | 3.8 | 9.9 | 21.3 | 9.5 |
| Example 2 | 9 | 6.9 | 14.0 | 24.3 | 14.0 |

The invention claimed is:

1. An absorbent article comprising:
a liquid-permeable topsheet;
a backsheet; and
an absorbent core sandwiched between the topsheet and the backsheet,
wherein the absorbent article extends in a longitudinal direction (L) and in a transverse direction (T),
wherein the absorbent article defines a front waist portion, a rear waist portion, a crotch portion arranged between the rear waist portion and the front waist portion as seen in the longitudinal direction (L), and a buttocks portion arranged between the crotch portion and the rear waist portion,
wherein the topsheet comprises a first lubricant zone provided with a lubricant agent,
wherein the first lubricant zone is arranged over the buttocks portion,
wherein the first lubricant zone overlaps a majority of a rear edge of the absorbent core,
wherein an entire perimeter of the first lubricant zone is bounded by a lubricant agent free zone, and
wherein an entirety of the first lubricant zone is on a rear side of a longitudinal center of the absorbent article and spaced apart from the longitudinal center.

2. The absorbent article according to claim 1, wherein the absorbent article has a Rewet 1-6 value of 60 gsm or less as measured according to a Rewet Under Pressure method.

3. The absorbent article according to claim 1, wherein the absorbent article has a Rewet 5 value of 30 gsm or less as measured according to a Rewet Under Pressure method.

4. The absorbent article according to claim 1, wherein the absorbent article has a Rewet 4 value of 20 gsm, as measured according to a Rewet Under Pressure method.

5. The absorbent article according to claim 1, wherein the absorbent article has a Rewet 3 value of 10 gsm or less, as measured according to a Rewet Under Pressure method.

6. The absorbent article according to claim 1, wherein the amount of lubricating agent in the first lubricant zone is 10 ppm to 10% by weight, based on the total weight of the topsheet in the first lubricant zone of the topsheet.

7. The absorbent article according to claim 1, wherein the first lubricant zone has a surface area of 25 cm$^2$ or greater.

8. The absorbent article according to claim 1, wherein the first lubricant zone extends over the buttocks portion and over the rear waist portion.

9. The absorbent article according to claim 1, wherein the lubricant agent free zone extends to the crotch portion.

10. The absorbent article according to claim 9, wherein the lubricant agent free zone has a surface area of 50 cm$^2$ or greater.

11. The absorbent article according to claim 1,
wherein the topsheet comprises a second lubricant zone, and
wherein the amount of lubricant agent in the second lubricant zone is lower than in the first lubricant zone.

12. The absorbent article according to claim 11, wherein the amount of lubricating agent in first lubricant zone is at least 25% higher than in the second lubricant zone.

13. The absorbent article according to claim 11, wherein the second lubricant zone is provided in the rear waist portion on the user facing side of the article.

14. The absorbent article according to claim 1, wherein the lubricant agent is provided in a composition having a water content less than 5.0 weight percent, or less than 1.0 weight percent.

15. The absorbent article according to claim 1, wherein the lubricant agent is any one, or a combination, of the following; wax, a lubricant agent comprising an alkoxylated diester selected from the group consisting of fatty ester lubricants or a lubricant agent comprising silicone oil.

16. The absorbent article according to claim 1, wherein the thickness of the absorbent article in the buttocks portion is from 3 mm at 0.5 kPa, as measured according to WSP120.6.R4.

17. The absorbent article according to claim 1, wherein the backsheet is a vapor permeable backsheet defining a Water Vapor Transmission Rate (WVTR) of at least 3500 grams per square meter per 24 hours.

18. The absorbent article according to claim 1, wherein the topsheet is a fibrous nonwoven layer.

19. The absorbent article according to claim 1,
wherein the absorbent core comprises a first absorbent layer and a second absorbent layer,
wherein the first absorbent layer has a first absorbent layer front edge and a first absorbent layer rear edge,
wherein the second absorbent layer has a second absorbent layer front edge and a second absorbent layer rear edge, the absorbent layers each having a size and a shape in a plane of the absorbent article, the size and shape of the second absorbent layer defining the size and shape of the absorbent core in the plane of the absorbent article, and wherein the first absorbent layer is shorter than the second absorbent layer, as seen in the longitudinal direction (L) of the absorbent article.

20. The absorbent article according to claim 19, wherein each of the first and the second absorbent layers comprises superabsorbent polymers.

21. The absorbent article according to claim 19,
wherein the first absorbent layer front edge is arranged with a front edge distance (d1) from the second absorbent layer front edge and the first absorbent layer rear edge is arranged with a rear edge distance (d2) from the second absorbent layer rear edge, and
wherein a ratio between the front edge distance (d1) and the rear edge distance (d2) is 1.5 or greater.

22. The absorbent article according to claim 19,
wherein the absorbent article comprises a transfer layer arranged between the topsheet and the absorbent core, the transfer layer having a transfer layer front edge and a transfer layer rear edge, the transfer layer front edge being arranged with a second front edge distance d3 from the second absorbent layer front edge and the transfer layer rear edge being arranged with a second rear edge distance d4 from the second absorbent layer rear edge, and
wherein a ratio between the second front edge distance d3 and the second rear edge distance d4 is 1 or greater.

23. The absorbent article according to claim 1, wherein the rear waist portion of the absorbent article is free from elastic threads.

24. The absorbent article according to claim 1, wherein the article is constituted by a diaper or incontinence pad of the open diaper type or the belt-type absorbent article.

25. The absorbent article according to claim 1, wherein a rear longitudinal end of the first lubricant zone is closer to a rear longitudinal end of the absorbent article.

26. The absorbent article according to claim 1, wherein a minimum width of the first lubricant zone in the transverse direction is greater than a minimum width of the topsheet in the transverse direction.

27. The absorbent article according to claim 1, wherein a longitudinal center of the absorbent article does not have a lubricant agent.

28. The absorbent article of claim 1, wherein the first lubricant zone extends beyond the rear edge of the absorbent core and overlaps a rear elastic portion of the absorbent article.

29. An absorbent article comprising:
a liquid-permeable topsheet;
a backsheet; and
an absorbent core sandwiched between the topsheet and the backsheet,
wherein the absorbent article extends in a longitudinal direction (L) and in a transverse direction (T),
wherein the absorbent article defines a front waist portion, a rear waist portion, a crotch portion arranged between the rear waist portion and the front waist portion as seen in the longitudinal direction (L), and a buttocks portion arranged between the crotch portion and the rear waist portion,
wherein the topsheet comprises a first lubricant zone provided with a lubricant agent,
wherein the first lubricant zone is arranged over the buttocks portion,
wherein the absorbent core comprises a first absorbent layer and a second absorbent layer,
wherein the first absorbent layer has a first absorbent layer front edge and a first absorbent layer rear edge,
wherein the second absorbent layer has a second absorbent layer front edge and a second absorbent layer rear edge, the absorbent layers each having a size and a shape in a plane of the absorbent article, the size and shape of the second absorbent layer defining the size and shape of the absorbent core in the plane of the absorbent article,
wherein the first absorbent layer is shorter than the second absorbent layer, as seen in the longitudinal direction (L) of the absorbent article,
wherein each of the first and the second absorbent layers comprises superabsorbent polymers,
wherein the first absorbent layer is an upper absorbent layer and the second absorbent layer is a lower absorbent layer,
wherein the amount of superabsorbent polymer is from 1.6 times higher in the upper absorbent layer than in the lower absorbent layer, and
wherein the first lubricant zone extends beyond a rear edge of the absorbent core and overlaps a rear elastic portion of the absorbent article.

30. A belt-type absorbent article,
wherein the absorbent article is a belted absorbent article comprising an absorbent pad and a separate belt,
wherein the pad is detachably attached to the separate belt,
wherein the separate belt is configured to be placed around the waist of the wearer to hold the pad when the article is being worn,
wherein the absorbent pad comprises:
a liquid-permeable topsheet,
a backsheet, and
an absorbent core sandwiched between the topsheet and the backsheet,
wherein the absorbent pad extends in a longitudinal direction and in a transverse direction,
wherein the absorbent pad defines a front waist portion, a rear waist portion, and a crotch portion arranged between the rear waist portion and the front waist portion as seen in the longitudinal direction (L), and a buttocks portion arranged between the crotch portion and the rear waist portion,
wherein the article in the buttocks portion in a first lubricant zone arranged on the topsheet is provided with a lubricant agent,
wherein the separate belt is provided with a lubricant agent in a belt lubricant zone,
wherein the first lubricant zone overlaps a majority of a rear edge of the absorbent core,
wherein an entire perimeter of the first lubricant zone is bounded by a lubricant agent free zone, and
wherein an entirety of the first lubricant zone is on a rear side of a longitudinal center of the absorbent article and spaced apart from the longitudinal center.

31. The belt-type absorbent article according to claim 30, wherein the amount of lubricant agent in the belt lubricant zone is lower than the amount of lubricant agent in the first lubricant zone, as measured in grams lubricant agent and per $cm^2$.

32. The belt-type absorbent article according to claim 30, wherein a rear longitudinal end of the first lubricant zone is closer to a rear longitudinal end of the absorbent article.

33. The belt-type absorbent article according to claim 30, wherein the first lubricant zone and the belt lubricant zone overlap along the transverse direction.

34. The belt-type absorbent article according to claim 30, wherein a longitudinal center of the absorbent article does not have lubricant agent.

35. The belt-type absorbent article of claim 30, wherein the first lubricant zone extends beyond the rear edge of the absorbent core and overlaps a rear elastic portion of the absorbent article.

* * * * *